US007102074B2

(12) United States Patent
Yen et al.

(10) Patent No.: US 7,102,074 B2
(45) Date of Patent: Sep. 5, 2006

(54) PHOTOVOLTAIC ATTACHMENT SYSTEM

(76) Inventors: Kuo-Yow Yen, 24 E. Deerwood, Irvine, CA (US) 92604; Chung-Hou Tony Hsiao, 24 E. Deerwood, Irvine, CA (US) 92604

( * ) Notice: Subject to any disclaimer, the term of this patent is extended or adjusted under 35 U.S.C. 154(b) by 80 days.

(21) Appl. No.: 10/659,784

(22) Filed: Sep. 10, 2003

(65) Prior Publication Data
US 2005/0050811 A1 Mar. 10, 2005

(51) Int. Cl.
*E04D 13/18* (2006.01)
*H01L 25/00* (2006.01)
*H01L 31/042* (2006.01)
*F24J 2/00* (2006.01)

(52) U.S. Cl. .............. 136/244; 126/621; 248/237; 52/173.3

(58) Field of Classification Search .......... 52/173.3, 52/200, 553, 506, 263, 58, 90.2; 136/244, 136/251, 259, 249; 248/237; 126/621
See application file for complete search history.

(56) References Cited

U.S. PATENT DOCUMENTS

| 748,440 | A | * | 12/1903 | Jackson | 131/313 |
| 4,125,978 | A | * | 11/1978 | Schildge, Jr. | 52/223.1 |
| 4,620,771 | A | * | 11/1986 | Dominguez | 359/591 |
| 4,936,063 | A | * | 6/1990 | Humphrey | 52/200 |
| 5,067,685 | A | * | 11/1991 | Johnston, Jr. | 248/676 |
| 5,125,608 | A | * | 6/1992 | McMaster et al. | 248/163.1 |
| 5,338,369 | A | * | 8/1994 | Rawlings | 136/246 |
| 5,457,057 | A | * | 10/1995 | Nath et al. | 438/67 |
| 5,478,402 | A | * | 12/1995 | Hanoka | 136/251 |
| 5,571,338 | A | * | 11/1996 | Kadonome et al. | 136/251 |
| 5,647,915 | A | * | 7/1997 | Zukerman | 136/251 |
| 5,647,916 | A | * | 7/1997 | Guazzoni | 136/253 |
| 5,820,092 | A | * | 10/1998 | Thaler | 248/237 |
| 6,063,996 | A | * | 5/2000 | Takada et al. | 136/246 |
| 6,065,255 | A | * | 5/2000 | Stern et al. | 52/173.3 |
| 6,242,685 | B1 | * | 6/2001 | Mizukami et al. | 136/244 |
| 6,323,478 | B1 | * | 11/2001 | Fujisaki et al. | 250/214 SG |
| 6,360,491 | B1 | * | 3/2002 | Ullman | 52/22 |
| 6,380,478 | B1 | * | 4/2002 | Yamamoto et al. | 136/244 |
| 6,396,239 | B1 | * | 5/2002 | Benn et al. | 320/101 |
| 6,607,936 | B1 | * | 8/2003 | Nomura | 438/72 |
| 6,617,507 | B1 | * | 9/2003 | Mapes et al. | 136/251 |
| 2003/0010372 | A1 | * | 1/2003 | Dinwoodie | 136/244 |
| 2003/0015637 | A1 | * | 1/2003 | Liebendorfer | 248/237 |
| 2003/0177705 | A1 | * | 9/2003 | Forbis et al. | 52/3 |
| 2004/0011354 | A1 | * | 1/2004 | Erling | 126/621 |
| 2004/0123862 | A1 | * | 7/2004 | Hay | 126/621 |
| 2005/0166955 | A1 | * | 8/2005 | Nath et al. | 136/251 |
| 2005/0217665 | A1 | * | 10/2005 | Luconi | 126/696 |
| 2006/0059789 | A1 | * | 3/2006 | Sargent | 52/26 |

* cited by examiner

Primary Examiner—Robert Canfield
(74) Attorney, Agent, or Firm—Clement Cheng

(57) ABSTRACT

A photovoltaic attachment system for mounting photovoltaic panels on top of a building's roof is disclosed. The attachment system does not require drilling of holes into the roof and does not affect the integrity of the roof. The photovoltaic attachment system comprises of a grid of photovoltaic panels mounted on top of beams that are attached to the walls around the roof. The roof structure is not affected. No holes are drilled into or through the roof and no leakage of water through the roof will result from the mounting of the photovoltaic panels.

18 Claims, 11 Drawing Sheets

PHOTOVOLTAIC ATTACHMENT SYSTEM

BACKGROUND—FIELD OF INVENTION

The present invention relates generally to a photovoltaic mounting system. More specifically, the present invention is a mounting means for attaching photovoltaic panels on top of a building's roof.

BACKGROUND—DESCRIPTION OF RELATED ART

The collection of solar energy takes many forms. The most desirable configuration is the direct conversation of solar energy to electricity. The heart of the photovoltaic system is a thin flat layer of semiconductor material. When the material is struck by sunlight, electrons are freed, producing an electric current. The direct-current (DC) power is passed through a DC load, into a storage battery, or converted to alternating current (AC) for general use in electric utility grid. Typically, individual solar cells are ganged together to form photovoltaic modules. Typically, about half the cost of a solar system lies with the solar cell modules, and the remainder is directed toward power conditioning, electrical wiring, installation, and site preparation.

The photovoltaic panels are usually mounted on top of a building's roof to allow the maximum exposure to sunlight and least interference to the use of the building itself. The conventional mounting method requires drilling of holes either into or through the roof of a building to mount the solar panels on top of the roof. This conventional mounting method often results in leaks in the roof of a building due to improper sealing of the holes through the roof. Furthermore, the conventional mounting method also weakens the roof structure due to the numerous holes that are drilled through the roof to attach the photovoltaic panels to the roof. If there are air conditioning and ventilations pipes and ducts on top of the roof, they create additional obstacles for the mounting of the photovoltaic panels on top of the roof using conventional mounting methods.

SUMMARY OF THE INVENTION

The present invention is a photovoltaic attachment system for mounting photovoltaic panels on top of a building's roof. The attachment system does not require drilling of holes into the roof and does not affect the integrity of the roof. The photovoltaic attachment system comprises of a grid of photovoltaic panels mounted on top of beams that are attached to the walls around the roof. No holes are drilled into or through the roof. The roof structure is not affected and no leakage of water through the roof will result from the mounting of the photovoltaic panels.

DETAILED DESCRIPTION OF THE PREFERRED EMBODIMENT

Figure 1:
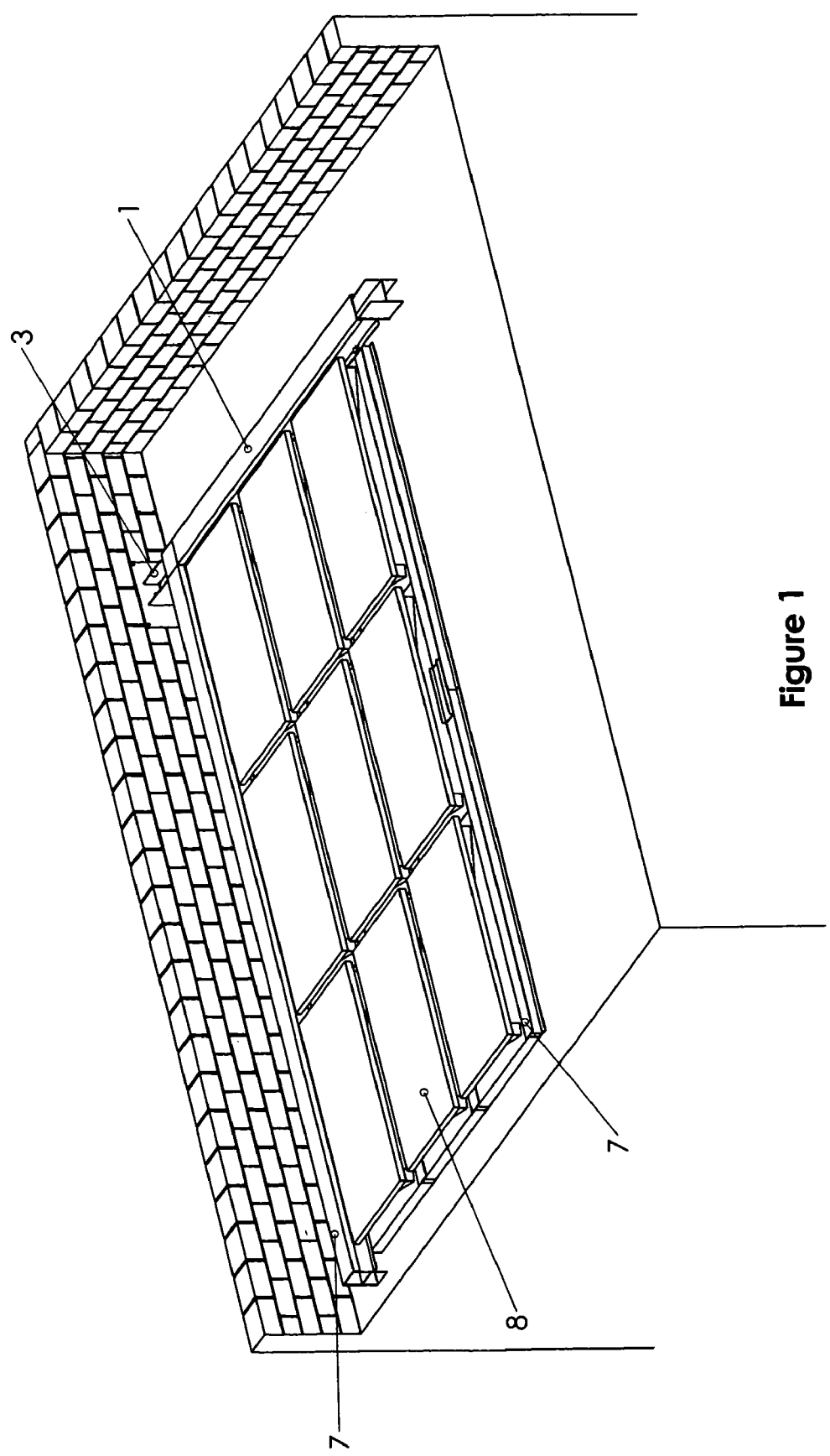
FIG. 1 shows a perspective view of the preferred embodiment of the photovoltaic attachment system.
Figure 2:
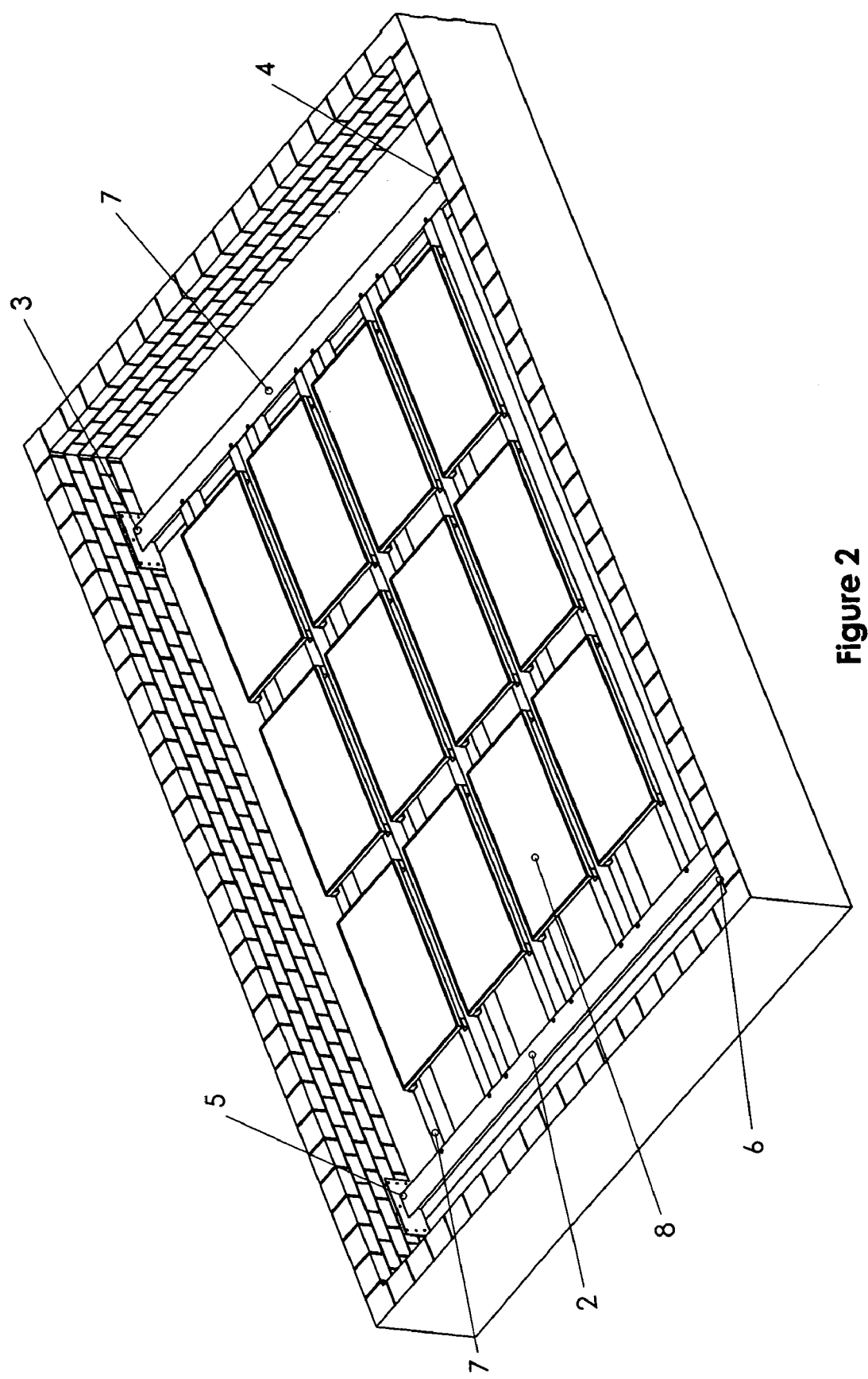
FIG. 2 shows another perspective view of the preferred embodiment of the photovoltaic attachment system.
Figure 3:
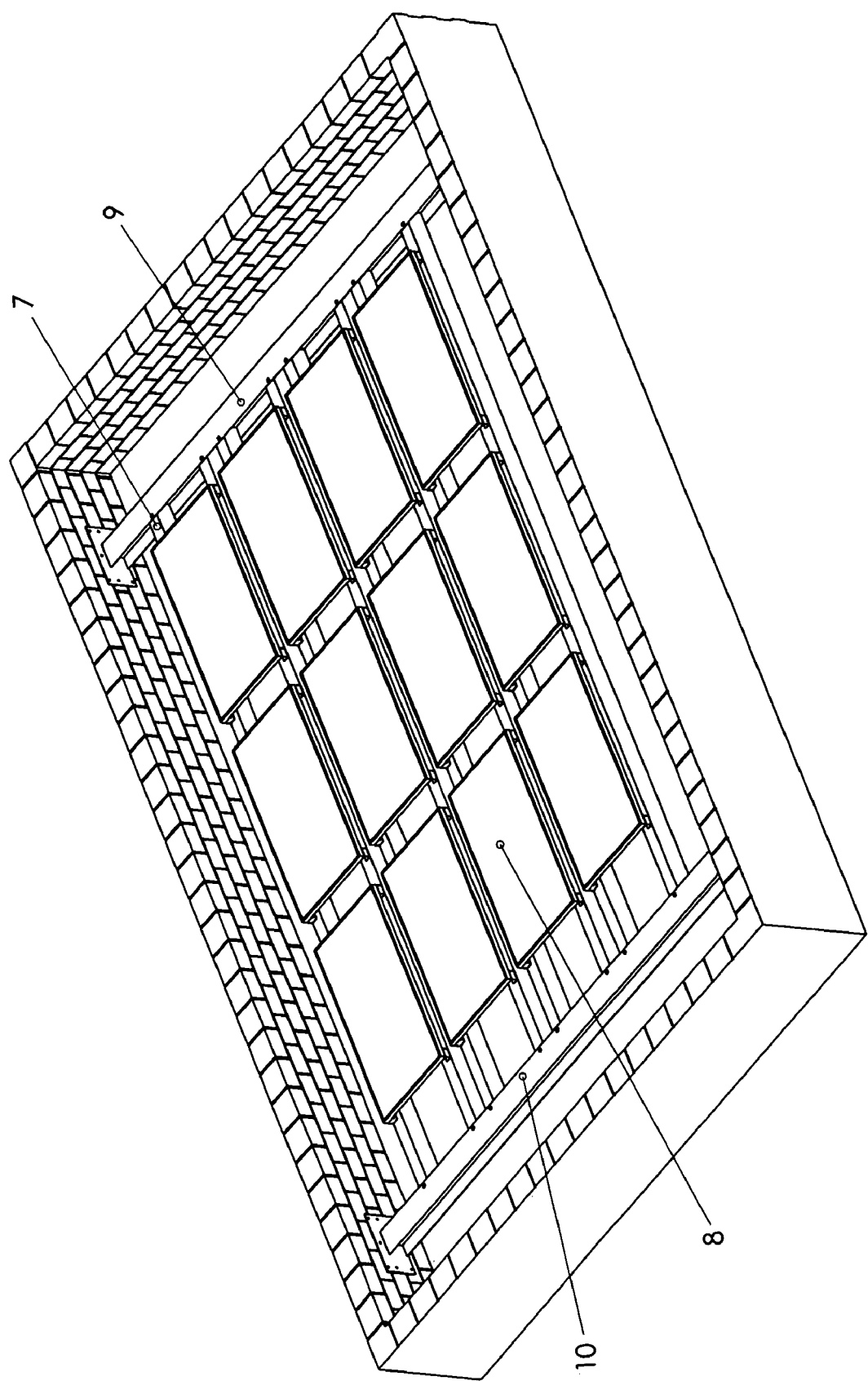
FIG. 3 shows a perspective view of another embodiment of the photovoltaic attachment system.

The current preferred embodiment of the photovoltaic attachment system is shown in FIG. 1. In the preferred embodiment, the photovoltaic attachment system comprises of two beams 1, 2 that are positioned parallel to each other and attached at their ends 3, 4, 5, 6 to two opposite walls on top of a roof. Cross-beams 7 are positioned across and affixed to the two beams 1, 2 to form a grid in which photovoltaic panels 8 are attached. As shown in FIG. 2, the two parallel beams 1, 2 may be oriented parallel to the roof. The two parallel beams 9, 10 may also be oriented at a slope relative to the roof from one end to the other as shown in FIG. 3. This attachment system does not require any penetration of the roof and does not affect the structural integrity of the roof.

Figure 4:
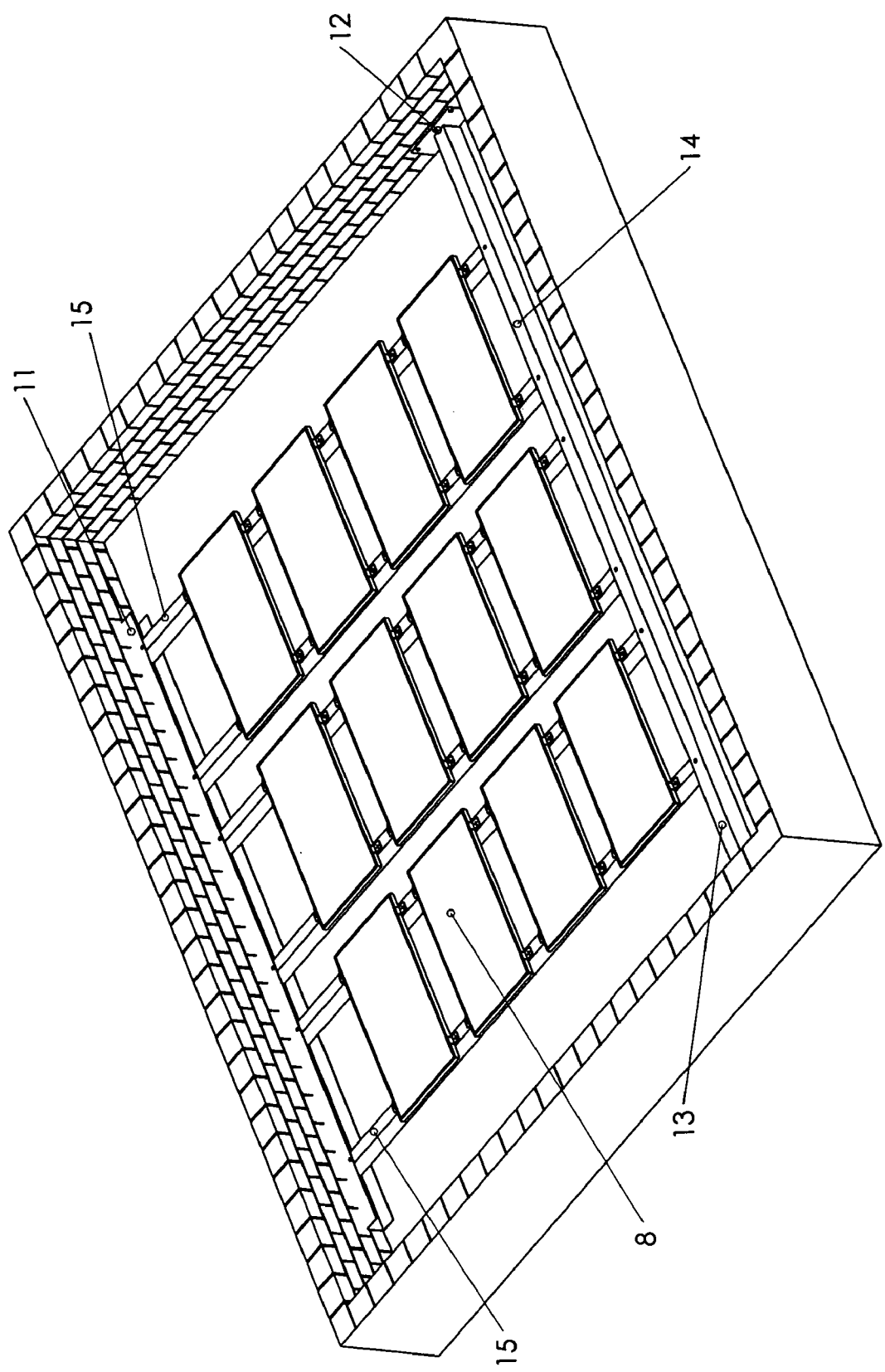
FIG. 4 shows a perspective view of another embodiment of the photovoltaic attachment system.
Figure 5:
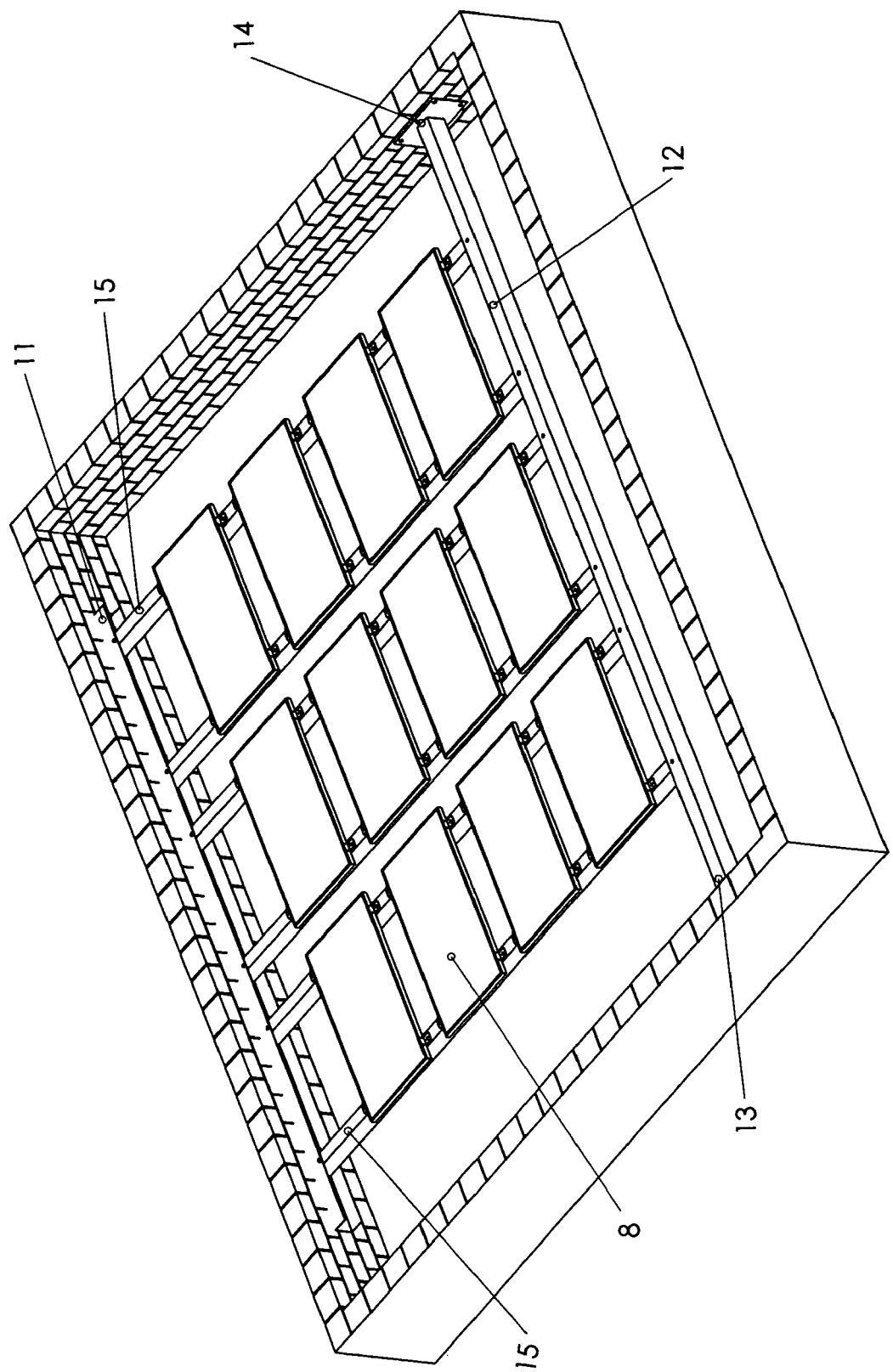
FIG. 5 shows a perspective view of another embodiment of the photovoltaic attachment system.

Another embodiment of the photovoltaic attachment system is shown in FIG. 4. In this embodiment, a pair of beams 11, 12 is positioned parallel to each other. One beam 11 is attached along its length parallel to one wall on the roof. The other beam 12 is attached to the two perpendicular walls to the first wall at its two ends 13, 14 and positioned parallel to the first beam 11. Multiple cross-beams 15 are then positioned across and affixed to the two beams 11, 12 to form a grid in which photovoltaic panels 8 are attached. The beams 11, 12, 15 may be oriented parallel to the roof as shown in FIG. 4. The beams 11, 12 may also be oriented at a slope relative to the roof from one beam to the other beam as shown in FIG. 5.

Figure 6:
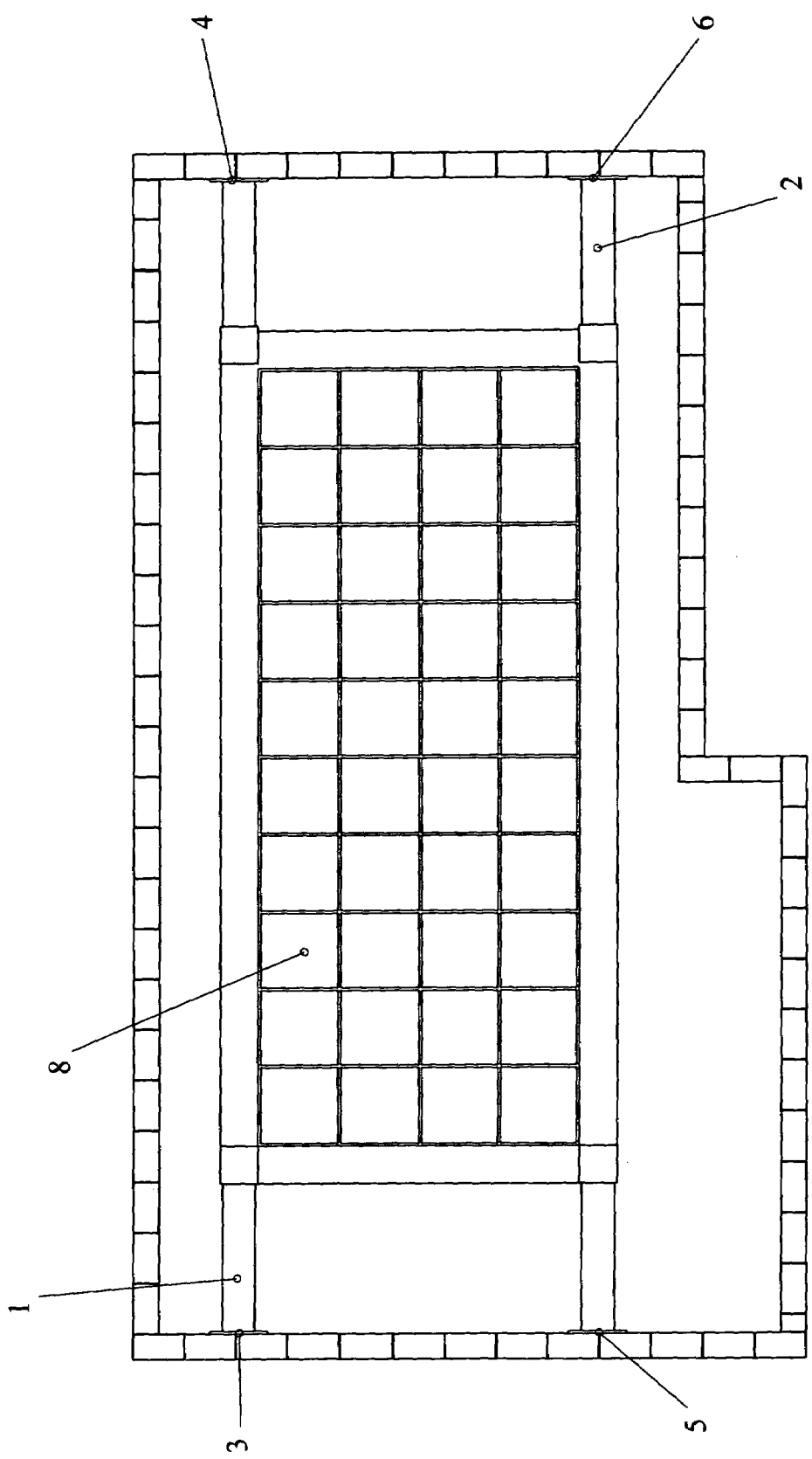
FIG. 6 shows the top view of a variation of the embodiment of the photovoltaic attachment system shown in FIG. 2.
Figure 7:
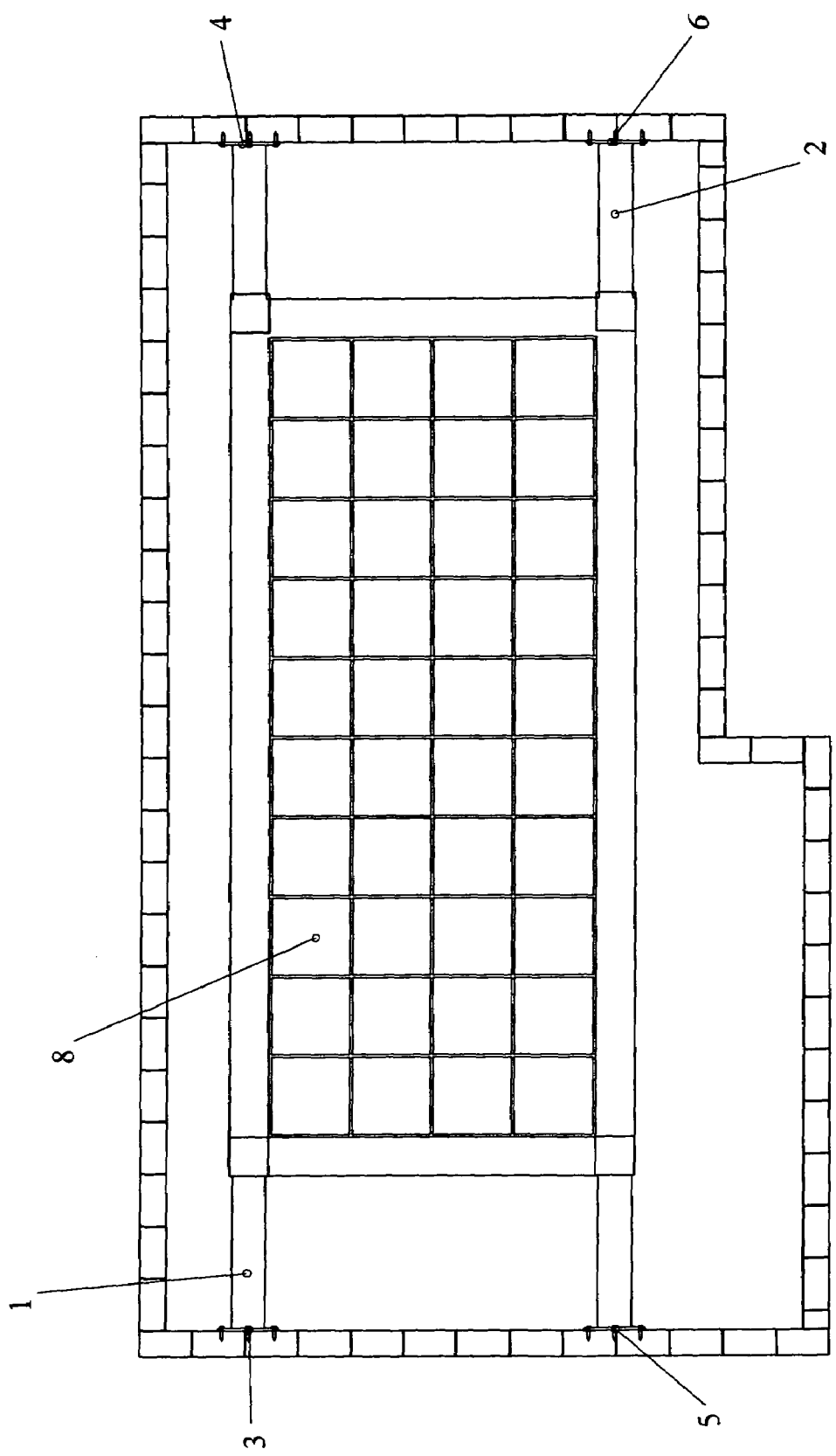
FIG. 7 shows the top view of another embodiment of the photovoltaic attachment system.
Figure 8:
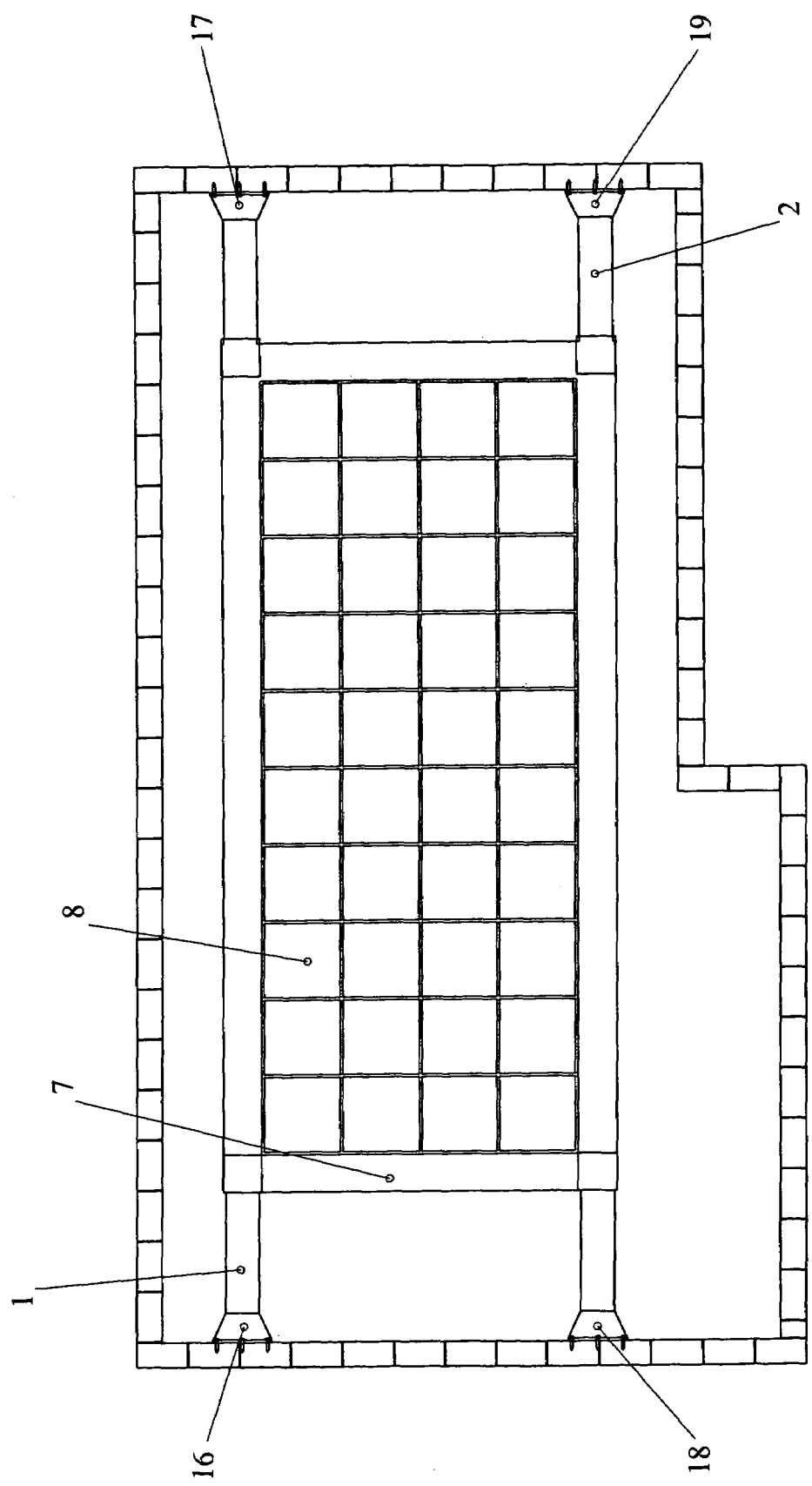
FIG. 8 shows the top view of another embodiment of the photovoltaic attachment system.

FIG. 6 shows the top view of a variation of the embodiment of the photovoltaic attachment system shown in FIG. 2. In this embodiment, the photovoltaic attachment system comprises of two beams 1, 2 that are positioned parallel to each other and attached at its ends 3, 4, 5, 6 to two opposite walls on top of a roof. The ends 3, 4, 5, 6 of the beams 1, 2 may be attached to the walls on top of a roof by bolts that securely attach the ends 3, 4, 5, 6 of the two beams 1, 2 to the walls as shown in FIG. 7. The ends 3, 4, 5, 6 may also be securely attached to the walls by attaching them with bolts to concrete blocks 16, 17, 18, 19 that are affixed to the walls on top of a roof as shown in FIG. 8. Cross-beams 7 are positioned across and affixed to the two beams 1, 2 to form a grid in which photovoltaic panels 8 are attached. The two parallel beams 1, 2 may be oriented parallel to the roof or may also be oriented at a slope relative to the roof from one end to the other. This attachment system does not require any penetration of the roof and does not affect the structural integrity of the roof.

Figure 9:
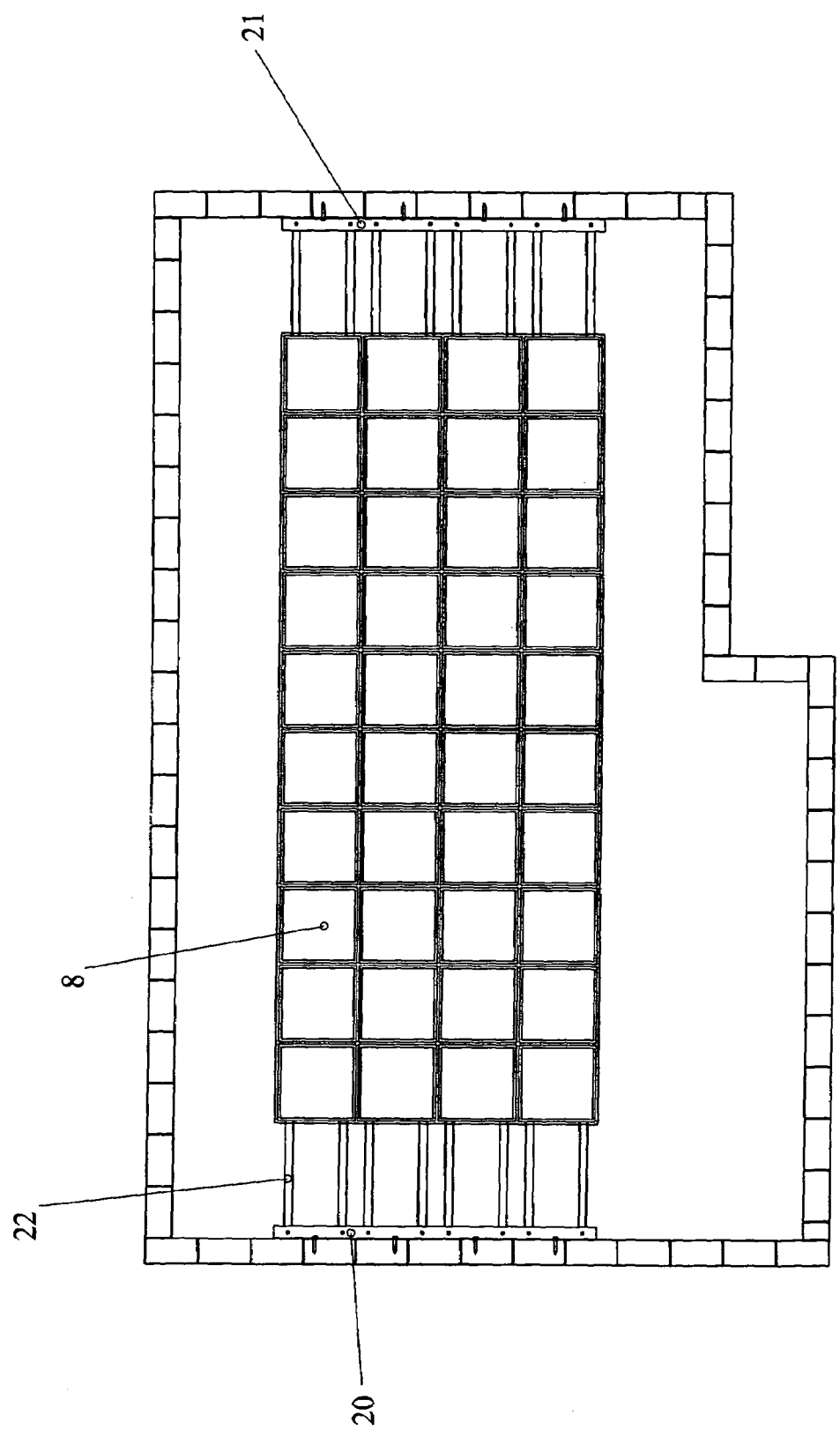
FIG. 9 shows the top view of another embodiment of the photovoltaic attachment system.

FIG. 9 shows another embodiment of the photovoltaic attachment system. In this embodiment, a pair of beams 20, 21 is positioned parallel to each other and each beam 20, 21 is attached along its length to a wall that is parallel to the other wall on the roof. Multiple cross-beams 22 are then positioned across and affixed to the two beams 20, 21 to form a grid in which photovoltaic panels 8 are attached. The beams 20, 21, 22 may be oriented parallel to the roof or may also be oriented at a slope relative to the roof from one beam 20 to the other beam 21.

Figure 10:
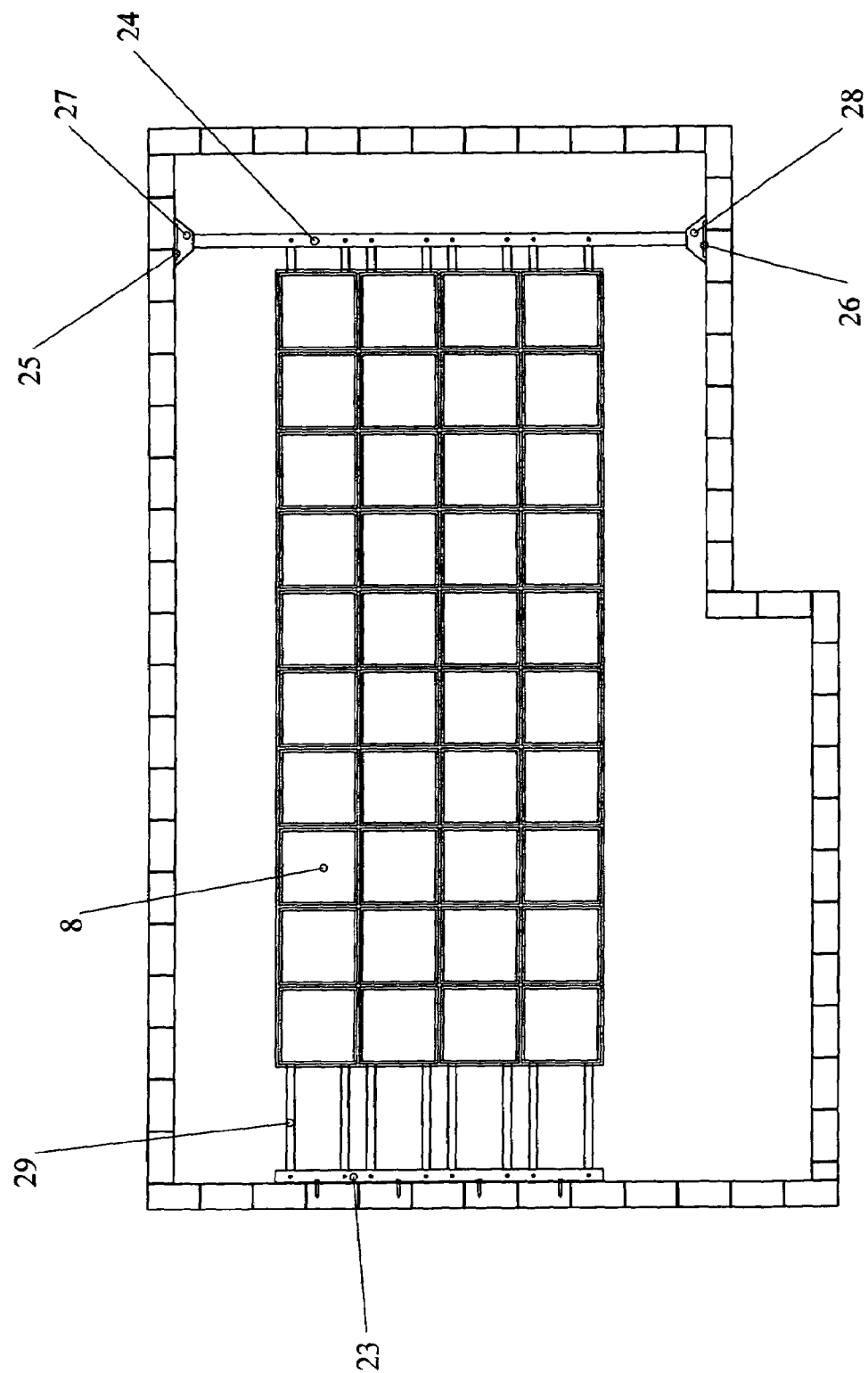
FIG. 10 shows the top view of another embodiment of the photovoltaic attachment system.

FIG. 10 shows another embodiment of the photovoltaic attachment system. In this embodiment, a pair of beams 23, 24 is positioned parallel to each other. One beam 23 is attached along its length to one wall on the roof. The other beam 24 is attached to the two perpendicular walls to the first wall at its two ends 25, 26 and positioned parallel to the first beam 23. The ends 25, 26 of the beam may be attached directly to the walls or may be attached to concrete blocks 27, 28 that are attached to the walls. Multiple cross-beams 29 are then positioned across and affixed to the two beams 23, 24 to form a grid in which photovoltaic panels 8 are attached. The beams 23, 24, 29 may be oriented parallel to the roof or may also be oriented at a slope relative to the roof from one beam 23 to the other beam 24.

Figure 11:
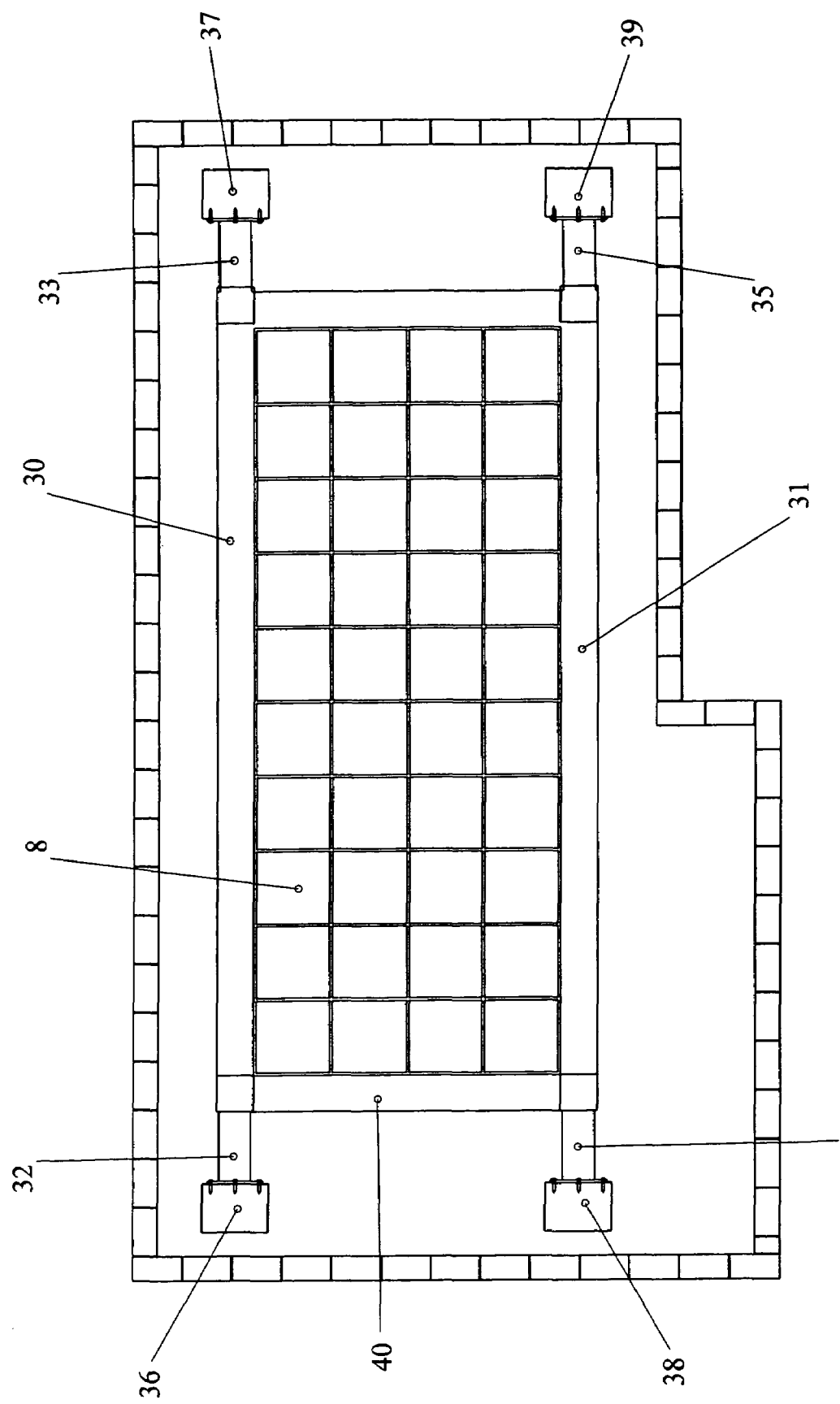
FIG. 11 shows the top view of another embodiment of the photovoltaic attachment system.

FIG. 11 shows another embodiment of the photovoltaic attachment system. In this embodiment, the photovoltaic attachment system comprises of two beams 30, 31 that are positioned parallel to each other and attached at its ends 32, 33, 34, 35 to concrete blocks 36, 37, 38, 39 that are positioned near two opposite walls on top of a roof. Cross-beams 40 are positioned across and affixed to the two beams 30, 31 to form a grid in which photovoltaic panels 8 are attached. The two parallel beams 30, 31 may be oriented parallel to the roof or may also be oriented at a slope relative to the roof from one end to the other. This attachment system does not require any penetration of the roof and does not affect the structural integrity of the roof.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A photovoltaic attachment system mounted above a roof surface comprising:
    a. two or more beams forming a base structure that is attached to a vertical surface of walls above and around a roof of a building without penetration of the roof;
    b. cross beams attached to the two or more beams base structure to form a grid structure; and
    c. one or more photovoltaic panels mounted on the grid structure.
2. A photovoltaic attachment system as in claim 1, wherein the beams are made of metal.
3. A photovoltaic attachment system as in claim 1, wherein the two or more beams are parallel to each other.
4. A photovoltaic attachment system as in claim 1, wherein the beams are parallel to the roof.
5. A photovoltaic attachment system as in claim 2, wherein the two or more beams are parallel to each other.
6. A photovoltaic attachment system as in claim 5, wherein the beams are parallel to the roof.
7. A photovoltaic attachment system mounted above a roof surface comprising:
    a. two or more beams attached to concrete blocks forming a base structure that is affixed to a vertical surface of the walls above and around a roof of a building without penetration of the roof; and
    b. cross beams attached to the two or more beams to form a grid structure, and
    c. one or more photovoltaic panels mounted on the beams of the grid structure.
8. A photovoltaic attachment system as in claim 7, wherein the beams are made of metal.
9. A photovoltaic attachment system as in claim 7, wherein the two or more beams are parallel to each other.
10. A photovoltaic attachment system as in claim 7, wherein the beams are parallel to the roof.
11. A photovoltaic attachment system as in claim 8, wherein the two or more beams are parallel to each other.
12. A photovoltaic attachment system as in claim 11, wherein the beams are parallel to the roof.
13. A photovoltaic attachment system mounted above a roof surface comprising:
    a. two or more beams forming a base structure attached to concrete blocks which are affixed to a vertical surface of a roof of a building without penetration of the roof;
    b. cross beams attached to the two or more beams base structure to form a grid structure; and
    c. one or more photovoltaic panel mounted on the beams of the grid structure.
14. A photovoltaic attachment system as in claim 13, wherein the beams are made of metal.
15. A photovoltaic attachment system as in claim 14, wherein the two or more beams are parallel to each other.
16. A photovoltaic attachment system as in claim 14, wherein the beams are parallel to the roof.
17. A photovoltaic attachment system as in claim 15, wherein the two or more beams are parallel to each other.
18. A photovoltaic attachment system as in claim 17, wherein the beams are parallel to the roof.

* * * * *